(12) United States Patent
Naik

(10) Patent No.: US 7,779,357 B2
(45) Date of Patent: Aug. 17, 2010

(54) AUDIO USER INTERFACE FOR COMPUTING DEVICES

(75) Inventor: Devang K. Naik, San Jose, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 11/733,126

(22) Filed: Apr. 9, 2007

(65) Prior Publication Data

US 2007/0180383 A1    Aug. 2, 2007

Related U.S. Application Data

(63) Continuation of application No. 10/981,993, filed on Nov. 4, 2004.

(51) Int. Cl.
*G06F 3/16* (2006.01)

(52) U.S. Cl. .................. 715/727; 715/729; 715/716; 715/864; 715/865

(58) Field of Classification Search ......... 715/270–271, 715/716, 727, 810–845
See application file for complete search history.

(56) References Cited

U.S. PATENT DOCUMENTS

| | | | | |
|---|---|---|---|---|
| 4,677,570 | A * | 6/1987 | Taki | 715/810 |
| 5,533,182 | A * | 7/1996 | Bates et al. | 715/727 |
| 5,721,827 | A | 2/1998 | Logan et al. | 709/217 |
| 6,035,336 | A * | 3/2000 | Lu et al. | 709/232 |
| 6,556,971 | B1 * | 4/2003 | Rigsby et al. | 704/270 |
| 6,720,980 | B1 * | 4/2004 | Lui et al. | 715/728 |
| 6,728,675 | B1 * | 4/2004 | Maddalozzo et al. | 704/258 |
| 6,728,729 | B1 | 4/2004 | Jawa et al. | 707/104.1 |
| 6,731,312 | B2 * | 5/2004 | Robbin | 715/792 |
| 6,741,264 | B1 * | 5/2004 | Lesser | 715/727 |
| 6,760,754 | B1 * | 7/2004 | Isaacs et al. | 709/206 |
| 6,917,373 | B2 * | 7/2005 | Vong et al. | 715/840 |
| 6,999,066 | B2 * | 2/2006 | Litwiller | 345/173 |

(Continued)

FOREIGN PATENT DOCUMENTS

EP    0 981 236 A1    2/2000

(Continued)

OTHER PUBLICATIONS

Mobile Speech Solutions, Mobile Accessibility, Product Information Sheet, SVOX AG, at http://www.svox.com/site/bra840604/con782768/mob965831936.asp?osLang=1.

(Continued)

*Primary Examiner*—Ting Lee
*Assistant Examiner*—Ashraf Zahr
(74) *Attorney, Agent, or Firm*—Beyer Law Group LLP

(57) ABSTRACT

An audio user interface that generates audio prompts that help a user interact with a user interface of a computing device is disclosed. The audio prompts can provide audio indicators that allow a user to focus his or her visual attention upon other tasks such as driving an automobile, exercising, or crossing a street, yet still enable the user to interact with the user interface. As examples, the audio prompts provided can audiblize the spoken version of a user interface selection, such as a selected function or a selected (e.g., highlighted) menu item of a display menu. The computing device can be, for example, a media player such as an MP3 player, a mobile phone, or a personal digital assistant.

38 Claims, 9 Drawing Sheets

U.S. PATENT DOCUMENTS

| | | |
|---|---|---|
| 7,000,189 B2 * | 2/2006 | Dutta et al. ............... 715/727 |
| 7,058,889 B2 * | 6/2006 | Trovato et al. ............. 715/716 |
| 7,174,295 B1 * | 2/2007 | Kivimaki ................... 704/260 |
| 7,190,794 B2 * | 3/2007 | Hinde ......................... 381/17 |
| 7,219,123 B1 * | 5/2007 | Fiechter et al. ............ 709/203 |
| 7,246,151 B2 * | 7/2007 | Isaacs et al. ............... 709/206 |
| 2001/0030660 A1 | 10/2001 | Zainoulline |
| 2002/0080163 A1 * | 6/2002 | Morey ........................ 345/727 |
| 2003/0001881 A1 * | 1/2003 | Mannheimer et al. ....... 345/728 |
| 2003/0020760 A1 * | 1/2003 | Takatsu et al. ............. 345/810 |
| 2003/0074198 A1 | 4/2003 | Sussman ................... 704/270.1 |
| 2003/0079038 A1 * | 4/2003 | Robbin et al. .............. 709/232 |
| 2003/0158737 A1 * | 8/2003 | Csicsatka .................... 704/273 |
| 2003/0167318 A1 * | 9/2003 | Robbin et al. .............. 709/221 |
| 2004/0051729 A1 * | 3/2004 | Borden, IV ................. 345/727 |
| 2004/0055446 A1 * | 3/2004 | Robbin et al. ................ 84/615 |
| 2004/0061717 A1 * | 4/2004 | Menon et al. ............... 345/727 |
| 2004/0114731 A1 * | 6/2004 | Gillett et al. ............. 379/88.03 |
| 2004/0225746 A1 * | 11/2004 | Niell et al. .................. 709/231 |
| 2005/0045373 A1 * | 3/2005 | Born ........................... 174/254 |
| 2005/0102625 A1 * | 5/2005 | Lee et al. .................... 715/727 |
| 2005/0108338 A1 * | 5/2005 | Simske et al. .............. 709/206 |
| 2006/0095846 A1 * | 5/2006 | Nurmi ........................ 715/701 |
| 2007/0044038 A1 * | 2/2007 | Horentrup et al. ........... 715/840 |

FOREIGN PATENT DOCUMENTS

| | | |
|---|---|---|
| EP | 1 311 102 A1 | 5/2003 |
| NL | 1 014 847 C1 | 8/2001 |

OTHER PUBLICATIONS

Anhui USTC iFLYTEK Co., Ltd., Information Datasheet, at http://www.iflytek.com/english/Research.htm, pp. 1-3.

Macsimum News—"Apple files patent for an audio interface for the iPod," downloaded from http://www.macsimumnews.com/index.php/archive/apple_files_patent_for_an_audio_interface_for_the_ipod/, posted May 4, 2006.

"Apple patents audio user interface—Engadget," downloaded from http://www.engadget.com/2006/05/04/apple-patents-audio-user-interface/ posted May 4, 2006.

"Phatnoise" downloaded from http://www.phatnoise.com/kenwood/kenwoodssamail.html on Jul. 13, 2006.

Office Action dated Feb. 5, 2008 from U.S. Appl. No. 10/981,993.
Office Action dated Jun. 8, 2009 from U.S. Appl. No. 10/981,993.
Office Action dated Aug. 5, 2008 from U.S. Appl. No. 10/981,993.
Office Action dated Dec. 23, 2008 from U.S. Appl. No. 10/981,993.
Office Action dated Aug. 28, 2009 from U.S. Appl. No. 10/981,993.

* cited by examiner

AUDIO USER INTERFACE FOR COMPUTING DEVICES

CROSS-REFERENCE TO RELATED APPLICATION

This application is a continuation of U.S. patent application Ser. No. 10/981,993, filed Nov. 4, 2004, entitled "AUDIO USER INTERFACE FOR COMPUTING DEVICES," the content of which is hereby incorporated by reference. This application is also related to U.S. patent application Ser. No. 10/623,339, filed Jul. 18, 2003, entitled "VOICE MENU SYSTEM," the content of which is hereby incorporated by reference.

FIELD OF THE INVENTION

The present invention relates generally to voice generation and, more specifically, to voice generation for computing devices.

BACKGROUND

People commonly use hand-held computing devices today for various personal and work-related purposes. Such hand-held devices are, for example, mobile phones, personal digital assistants (PDA's), media players (e.g., MP3 players), and digital cameras. Hand-held devices are increasingly popular because their small size allows people to easily carry and use the devices in remote locations.

In order to achieve portability, many hand-held devices use user interfaces that present various display screens to the user for interaction that is predominantly visual. Users can interact with the user interfaces to manipulate a scroll wheel and/or a set of buttons to navigate display screens to thereby access functions of the hand-held devices. However, these user interfaces can be difficult to use at times for various reasons. One reason is that the display screens tend to be small in size and form factor and therefore difficult to see. Another reason is that a user may have poor reading vision or otherwise be visually impaired. Even if the display screens can be perceived, a user will have difficulty navigating the user interface in "eyes-busy" situations when a user cannot shift visual focus away from an important activity and towards the user interface. Such activities include, for example, driving an automobile, exercising, and crossing a street.

In view of the foregoing, there are continuing needs to provide improved user interfaces for hand-held devices.

BRIEF SUMMARY OF THE INVENTION

The present invention is directed to an audio user interface that generates audio prompts that help a user navigate through the features of a computing device. The audio prompts provide audio indicators that allow a user to focus his or her visual attention upon other tasks such as driving an automobile, exercising, or crossing a street. In one embodiment the computing device is a media player (e.g., a portable audio device). In some embodiments, the computing device is a hand-held device that may have a scaled-down computer architecture that facilitates the device's portability.

As a hand-held electronic device, one embodiment of the invention can, for example, include at least: a media database that stores media content; a display device that is capable of displaying a user interface, the user interface presenting at least one menu, the at least one menu having a plurality of menu items; a user input device capable of receiving a user input pertaining to a selection of at least one of the menu items in the at least one menu; a memory that stores audio files, the audio files being associated with the menu items of the at least one menu; and a user interface control module that plays one of the audio files in response to the user input pertaining to a selection of at least one of the menu items in the at least one menu.

As a hand-held electronic device, another embodiment of the invention can, for example, include at least: a media database that stores media content for a plurality of media items; a user input device capable of receiving a user input pertaining to a selection of at least one of the menu items; a memory that stores audio files, the audio files are associated with at least one attribute of the menu items; and a user interface control module that plays one of the audio files in response to the user input pertaining to a selection of at least one of the menu items.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
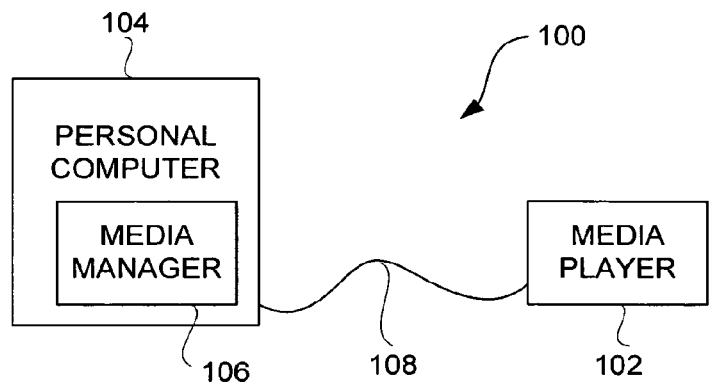
FIG. 1 is a block diagram of a media management system according to one embodiment of the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention pertains to an audio user interface that generates audio prompts that help a user interact with a user interface of a computing device. The audio prompts provide audio indicators that allow a user to focus his or her visual attention upon other tasks such as driving an automobile, exercising, or crossing a street, yet still enable the user to interact with the user interface. As examples, the audio prompts provided can audiblize the spoken version of the user interface selection, such as a selected function or a selected (e.g., highlighted) menu item of a display menu. The audio prompts are produced by voice generation techniques, which are also referred to as speech feedback techniques.

The computing device can be various types of devices such as, but not limited to, media players, mobile phones (e.g., cell phones), personal hand-held devices, game players, video players, digital cameras, and digital video cameras. The computing device can be a hand-held device (e.g., a portable music player) or a stationary device (e.g., a personal desk computer).

One aspect of the present invention pertains to techniques for providing an audio user interface on a hand-held computing device by efficiently leveraging the computing resources of a host computer system. The relatively powerful computing resources of the host computer can convert text strings into audio files that are then transferred to the hand-held computing device, which is a smaller computing platform often not well suited for converting text strings into audio files. For example, hand-held computing devices that include voice synthesis engines to provide test-to-speech conversion tend to produce poor quality audio due to their limited computing power and memory capacity. According to this aspect of the invention, the host computer system performs the processing intensive text-to-speech conversion so that the hand-held device only needs to perform the less intensive task of playing the audio file. This approach of utilizing the host computer system in addition to the hand-held computing device allows for increased quality for the text-to-speech conversions and helps reduce not only the computational requirements but also the size and weight of the hand-held computing device.

In one embodiment, an audio user interface according to the present invention is provided by a media management system. A media management system includes a host computer system and a hand-held computing system that facilitate providing an audio user interface on the hand-held computing device. As an example, the host computer system is a personal computer and the hand-held computing system is a media player. In some embodiments, the hand-held computing device provides for multi-modal interaction with the user interface. For example, a user can interact with the user interface through audio and visual prompts.

FIG. 1 is a block diagram of a media management system 100 according to one embodiment of the invention. The media management system 100 includes a media player 102 and a personal computer (host computer) 104. The media player 102 is, for example, a portable, battery-operated device. In one embodiment, the media player 102 is an MP3 player. The personal computer 104 includes a media manager 106. The media manager 106 enables a user of the personal computer 104 to directly manage media content stored on the personal computer 104, and to indirectly manage media content stored on the media player 102. A peripheral cable 108 couples the media player 102 to the personal computer 104. Typically, the peripheral cable 108 couples together data ports provided on the media player 102 and the personal computer 104. In one example, the data ports can be FIREWIRE ports and the peripheral cable 108 can be a FIREWIRE cable. In another example, the data ports can be Universal Serial Bus (USB) ports and the peripheral cable 108 can be a USB cable. More generally, the peripheral cable 108 acts as a data link. Media items can be transferred from the media player 102 to the personal computer 104 over the peripheral cable 108, and vice versa. For example, the media manager 106 facilitates a user with browsing, adding, deleting, organizing, and other operations with respect to media content (e.g., numerous media items) on the personal computer 104. Additionally, for example, the media manager 106 also facilitates a user with adding and removing media content on the media player 102. In other words, although the media manager 106 resides on the personal computer 104, at least certain management actions taken with respect to the media manager 106 can cause the media content at the media player 102 to be similarly managed (e.g., during synchronization).

In one embodiment, the media player is a portable computing device dedicated to processing media such as audio, video or images. For example, the media player 102 can be a music player (e.g., MP3 player), a game player, a video player, a video recorder, a camera, an image viewer, a mobile phone (e.g., cell phones), a personal hand-held device, and the like. These devices are generally battery operated and highly portable so as to allow a user to listen to music, play games or video, record video or take pictures wherever the user travels. In one implementation, the media player is a hand-held device that is sized for placement into a pocket or hand of the user. By being hand-held, the media player is relatively small and easily handled and utilized by its user. By being pocket-sized, the user does not have to directly carry the device and therefore the device can be taken almost anywhere the user travels (e.g., the user is not limited by carrying a large, bulky and often heavy device, as in a portable computer). Furthermore, the device may be operated by the user's hands so that no reference surface such as a desktop is needed.

In alternative embodiments, media player 102 may be computing devices that are not specifically limited to playing media files. For example, media player 102 can also be a mobile telephone or a personal digital assistant. The types of media transferred between personal computer 104 and media player 102 can also take the form of text files and any type of content that can be digitally stored on a computer.

Figure 2:
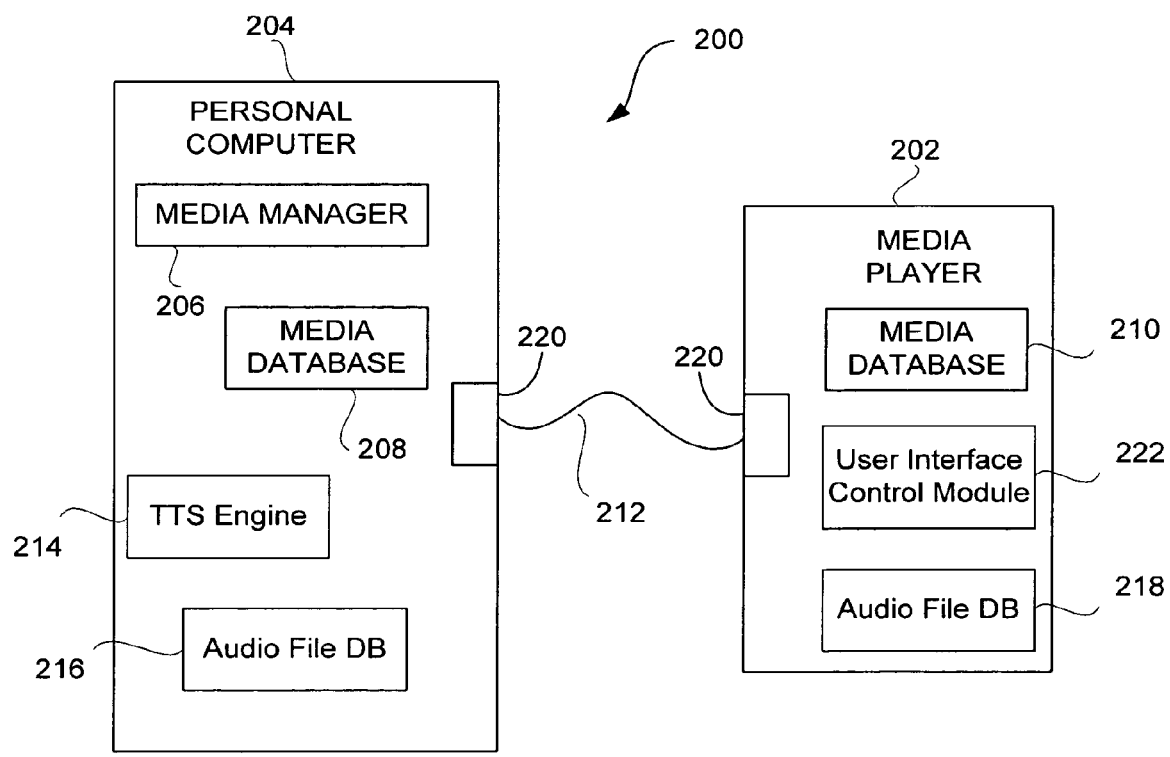
FIG. 2 is a block diagram of a media management system according to an alternative embodiment of the invention.

FIG. 2 is a block diagram of a media management system 200 according to another embodiment of the invention. The media management system 200 can, for example, represent a detailed embodiment of the media management system 100 shown in FIG. 1. The media management system 200 includes a media player 202 and a personal computer 204. The personal computer 204 includes a media manager 206. The personal computer 204 further includes a media database 208, a text-to-speech engine 214, an audio file database 216, and a communications port 220. The personal computer 204 serves as the host computer system to the media player 202. The personal computer 204 can also be any type of computer that acts as a server to the media player 202, which is the client.

The media player 202 includes a media database 210, an audio file database 218, a user interface control module 220, and communications port 220. Typically, the databases 210 and 218 can be stored to one or different data storage devices (e.g., disk drives). The media database 210 stores media content in media files, and the audio file database 218 stores audio files. The media content can pertain to songs, pictures, and movie files. The audio files stored in the audio file database 218 can be played to guide a user through an audio user interface. In one embodiment, a portion of the audio file database 218 can be stored to a cache memory for fast retrieval of audio files that are commonly used by a user. For example, commonly used audio files can relate to top-level menu items and text strings that relate to commonly played song files. A cache memory can also be used to store media content that is being played or soon to be played. In one embodiment, the audio file database 218 can be integral with the media database 210. The media player 202 also usually has a screen display for displaying information to a user and a processor (e.g., microprocessor) for controlling operation of the media player 202.

A peripheral cable 212 provides a data path (or data link) between the media player 202 and the personal computer 204. The peripheral cable 212 is connected to respective communication ports 220 on each of the personal computer 204 and the media player 202. The peripheral cable 212 provides a peripheral bus that couples the media player 202 to the personal computer 204. The peripheral bus, for example, could be a FIREWIRE bus or a Universal Serial Bus (USB).

The user interface control module 222 manages a user interface that allows a user to interact (e.g., navigate) with the media player 202. The user interface is visually presented on the screen display of the media player 202 and interaction with the user interface can cause audio prompts are played back through earphones or speakers. The user interface can, for example, allow the user of the media player 202 to browse, sort, search, play, etc. the media content resident on the media player 202. The user interface can also allow the user of the media player 202 to download (add) or delete (remove) media items from the media player 202. The media manager 206 also has a user interface that allows a user to browse, sort, search, play, make playlists, burn Compact Discs (CDs), etc. the media content resident on the personal computer 204. The user interface can also allow the user of the personal computer 204 to download (add) or delete (remove) media items from the personal computer 204. In one embodiment, the media manager 206 and its associated user interface are provided by iTunes®, version 4.6, from Apple Inc. of Cupertino, Calif. For further description on synchronization processes between personal computer 204 and media player 202, please refer to U.S. patent application Ser. No. 10/277,418 (APL1P228X1), entitled "Intelligent Interaction Between Media Player and Host Computer" filed on Oct. 21, 2002, which is hereby incorporated by reference for all purposes.

The text-to-speech conversion engine 214 is a software module that converts text strings into audio files that can be played to generate a user interface audio prompt that audiblizes (verbalizes) a respective text string. Such text-to-speech (TTS) engines can use various techniques for creating the audio files. For example, some algorithms use a technique of breaking a word down into fragments or syllables for which a certain sound is then designated. Then, a word can be verbalized through combining individual sounds. In the case where the media content pertains to music, these text strings may, for example, correspond to song titles, album names, artist names, contact names, addresses, phone numbers, and playlist names.

The audio file database 216 stores audio files that are generated by the TTS engine 214. In some embodiments, the audio files may be additionally or alternatively stored in media database 208. For example, audio files that are attached to associated media files can be conveniently stored together in media database 208.

The media database 210 has a number of media files and playlist files, which are used to classify, identify and/or describe media files in the media database 210. The media files can be, for example, song files. Each song file may contain media information that describes each song file. The media information might include, for example, the names of songs, the artist, the album, the size of the song, the format of the song, and any other appropriate information. Of course, the type of information may depend on the type of media. A video file might additionally have director and producer fields, but may not use the album field. In typical embodiments of media player 202, media files are non-editable when located within media player 202.

The playlist files contain information about each playlist available in the music database 210. Further, the information for a given playlist can include identifying information for each of the songs within the playlist. Playlists are collections of media files that may or may not be in any particular order. Users may choose to combine media files by genre, mood, artists, audience, or any other meaningful arrangement.

A synchronization operation between the file contents stored on the personal computer 204 and the file contents stored on the media player 202 can be achieved in a sophisticated manner through comparison of file contents stored in the respective media databases 208 and 210, and the respective audio file databases 216 and 218. When comparison of the file contents from the respective databases indicates that there is a particular media item resident on the personal computer 204 that is not resident on the media player 202, then the particular media item can be transmitted (downloaded) to the media player over the peripheral cable 212. On the other hand, when the comparison of the media information from the respective databases 208 and 210 indicates that a particular media item is resident on the media player 202 but is not resident on the personal computer 204, then the particular media item can be either removed (deleted) from the media player 202 or transmitted (e.g., uploaded) over the peripheral cable 212 to the personal computer 204. Hence, by providing the media player 202 with the media database 210, more sophisticated synchronization and management of file contents is enabled.

A synchronization operation between personal computer 204 and media player 202 can also ensure that media player 202 contains an audio file(s) for each text string or media file. The number of audio files to be downloaded onto media player 202 may depend upon user settings for the audio user interface. For example, a user may desire that audio files be associated with all or a subset of all text strings on media player 202.

When comparison of the media information indicates that a certain text string in the media player 202 does not have an associated audio file (by virtue of the content that is added or edited on the media player), that text string can copied to the personal computer 204. Then the text string can be converted to an associated audio file at the personal computer 204. The audio file can then be sent back to the media player 202 for use by the audio user interface. For example, the comparison can ensure that each playlist name or contact name, address, or phone number has an associated audio file. Also, as an example, the comparison can ensure that every song has an audio file associated with the song title, album name, and/or artist name.

Also, when a new media file, for example an MP3 song file, is downloaded into media player 202, the synchronization operation can ensure that both the media file and its associated one or more audio files are downloaded.

Figure 3:
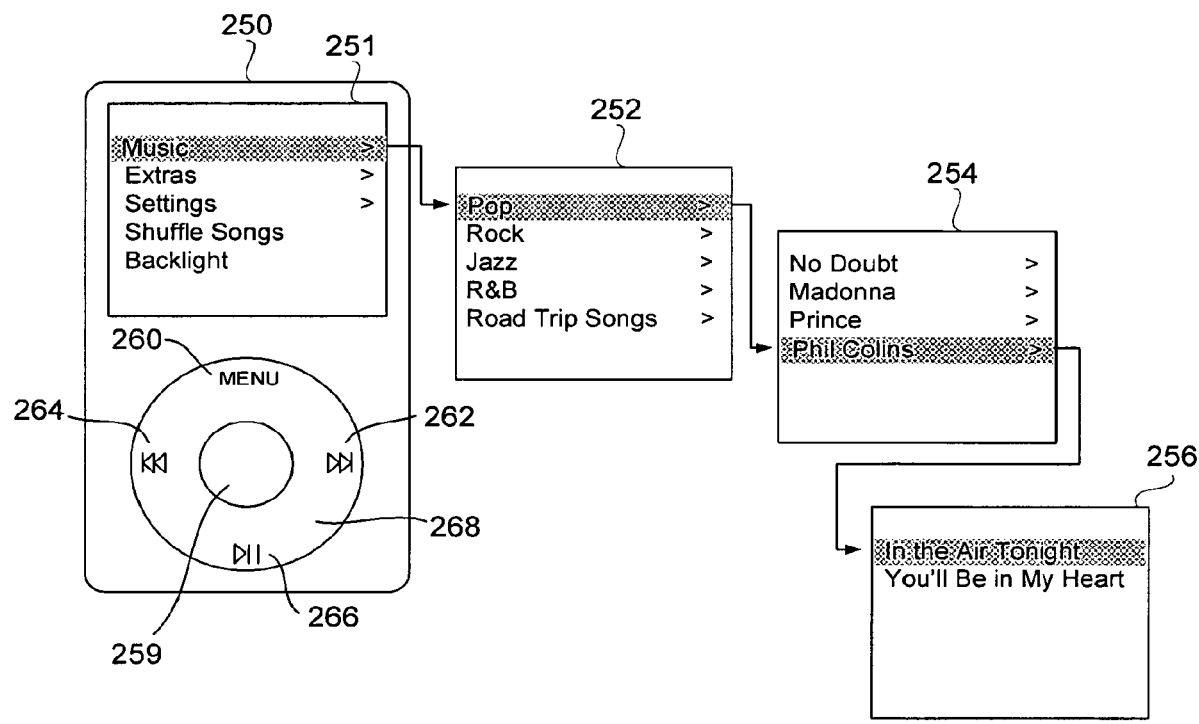
FIG. 3 illustrates a diagrammatic view of a media player and its associated set of nested menus according to one embodiment of the present invention.

FIG. 3 illustrates a diagrammatic view of a media player 250 and its associated set of nested menus according to one embodiment of the present invention. Media player 250 is a computer device for playing media files, such as song files. Media player 250 commonly contains memory that stores a media database, such as the media database 210 illustrated in FIG. 2, and a play module for playing the song files. The set of nested menus 251-256 represent at least part of a user interface that allows a user to navigate through, select, and thereby listen to desired song files. It is possible to reach a certain media file through different paths using the set of nested menus 250-256. The user interface also allows users to navigate and select a desired function provided by the media player 202.

As an example, the nested menus 251-256 illustrated in FIG. 3 a user has navigated through the nested menus 251-256 to select and listen to the song, "In the Air Tonight." This route began by selecting "Music" at the top-level menu 251, then selecting "Pop" at the second level menu 252, then selecting "Phil Collins" at the third level menu 254, and finally selecting "In the Air Tonight" at the fourth level menu 256. Note that FIG. 3 shows each of the selected menu items against a highlighted background.

FIG. 3 also illustrates representative user interface controls of the media player 202. According to one embodiment, the user interface controls include a menu button 260, a next button 262, a previous button 264, a play/pause button 266, and a scroll wheel 268. The scroll wheel 268 can be implemented as a rotating wheel apparatus that can rotate or a touch pad apparatus that understands a rotation user gesture. A user presses or rubs these user interface controls to navigate through the nested menus. In one embodiment, the media player 202 is an iPod® from Apple Inc.

Figure 4:
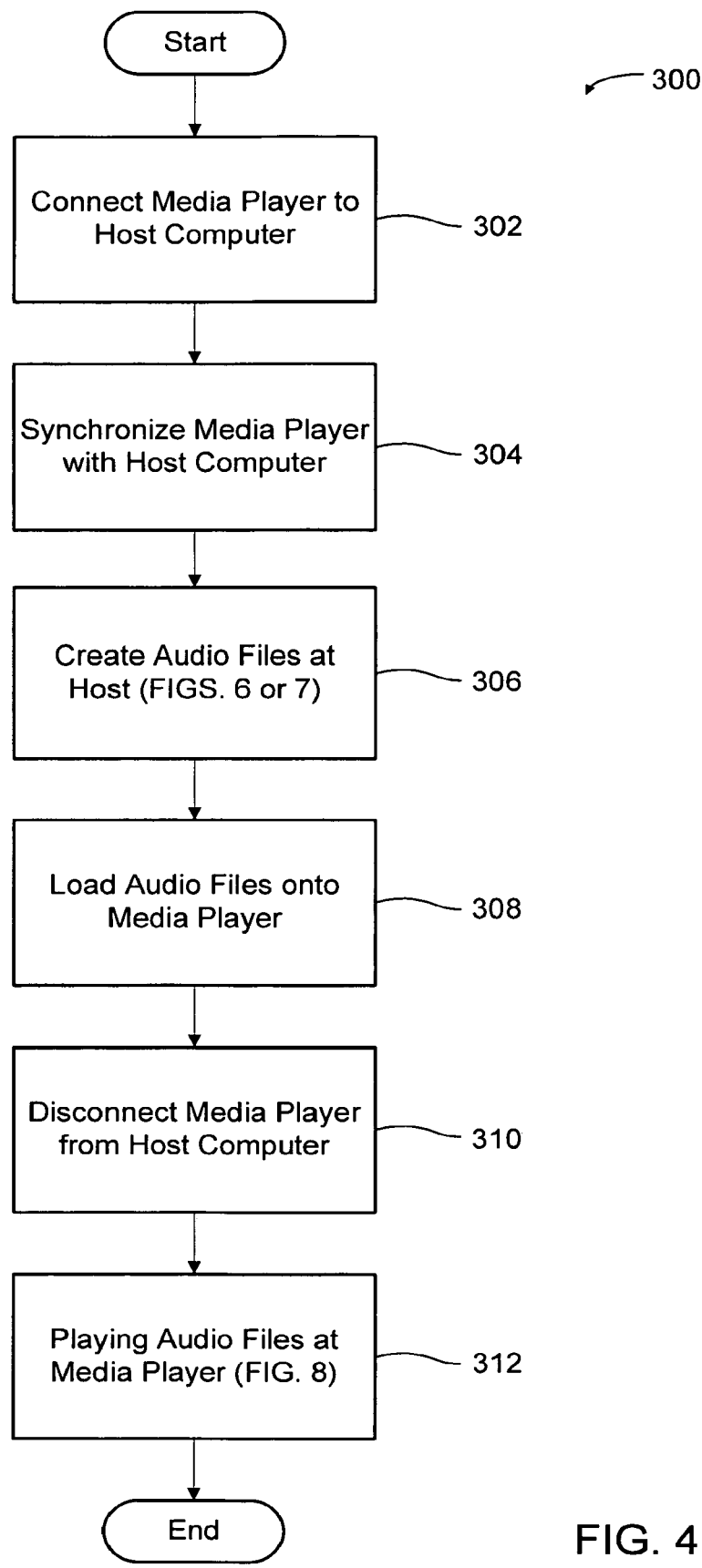
FIG. 4 illustrates a flow diagram of a process for providing a hand-held device with an audio user interface according to one embodiment of the present invention.

FIG. 4 illustrates a flow diagram of a process 300 for providing a hand-held device with an audio user interface according to one embodiment of the present invention. The process 300 generally involves creating audio files at a host computer system, loading the audio files into a hand-held computing device (e.g., media player), and then playing the audio files when appropriate at the hand-held device.

Specifically, the process 300 begins at block 302 where a media player is connected to a host computer system. As shown in FIGS. 1 and 2, a media player can be connected to a host computer system through a cable such as a FIREWIRE or USB cable. In alternative embodiments, the connection can be through a wireless communications protocol. Then, in block 304, a synchronization process is performed between the media player and the host computer system. Media files and text string (or audio files) stored on the media player and host computer systems are compared. Based on the comparison, appropriate files or text strings are copied between the media player and the host computer system. Hence, in block 304, not only are media files synchronized between the different platforms, but also text strings (or audio files) are synchronized between the different platforms. In one embodiment, text strings resident on the media player that require conversion into audio files can be uploaded into the host computer system for conversion.

In block 306, a text-to-speech (TTS) conversion engine at the host computer system converts text strings to audio files. The newly created audio files are stored at the host computer system and are also made ready for downloading onto the media player. The audio files are typically stored in the audio file database 216, but can also be stored in the media database 208, as shown in FIG. 2.

Next, in block 308, the audio files that have been created are downloaded into the media player from the host computer system. The audio files are typically stored in the audio file database 218, but can also be stored in the media database 210, as shown in FIG. 2. In one embodiment, a user can configure the extent to which audio files are created and/or downloaded. For example, a user can designate that all new audio files present at the host computer system be automatically downloaded into the media player. Alternatively, a user can manually select which of the newly generated audio files are to be downloaded. The downloading of audio files may cause pointers or lookup tables that store or reference the audio files at the media player to be updated. The process of downloading the audio files provides media player 202 with audio files that can be played by the user interface control module 220 to guide a user with user interface audio prompts. The audio files can be of higher quality since they are generated on the host computer system 204, which can support a more robust TTS engine 214 than could the media player 202, thereby enabling a richer user experience and seamless use.

In block 310, the media player is thereafter optionally disconnected from the host computer system so that the user can then freely use the media player without confinement to the personal computer 204. In block 312, the media player 202 plays the audio files in response to the user's interaction (e.g., navigation) through the audio user interface. The process 300 for providing an audio user interface can be repeated each time the media player is reconnected to the host computer system.

Figure 5:
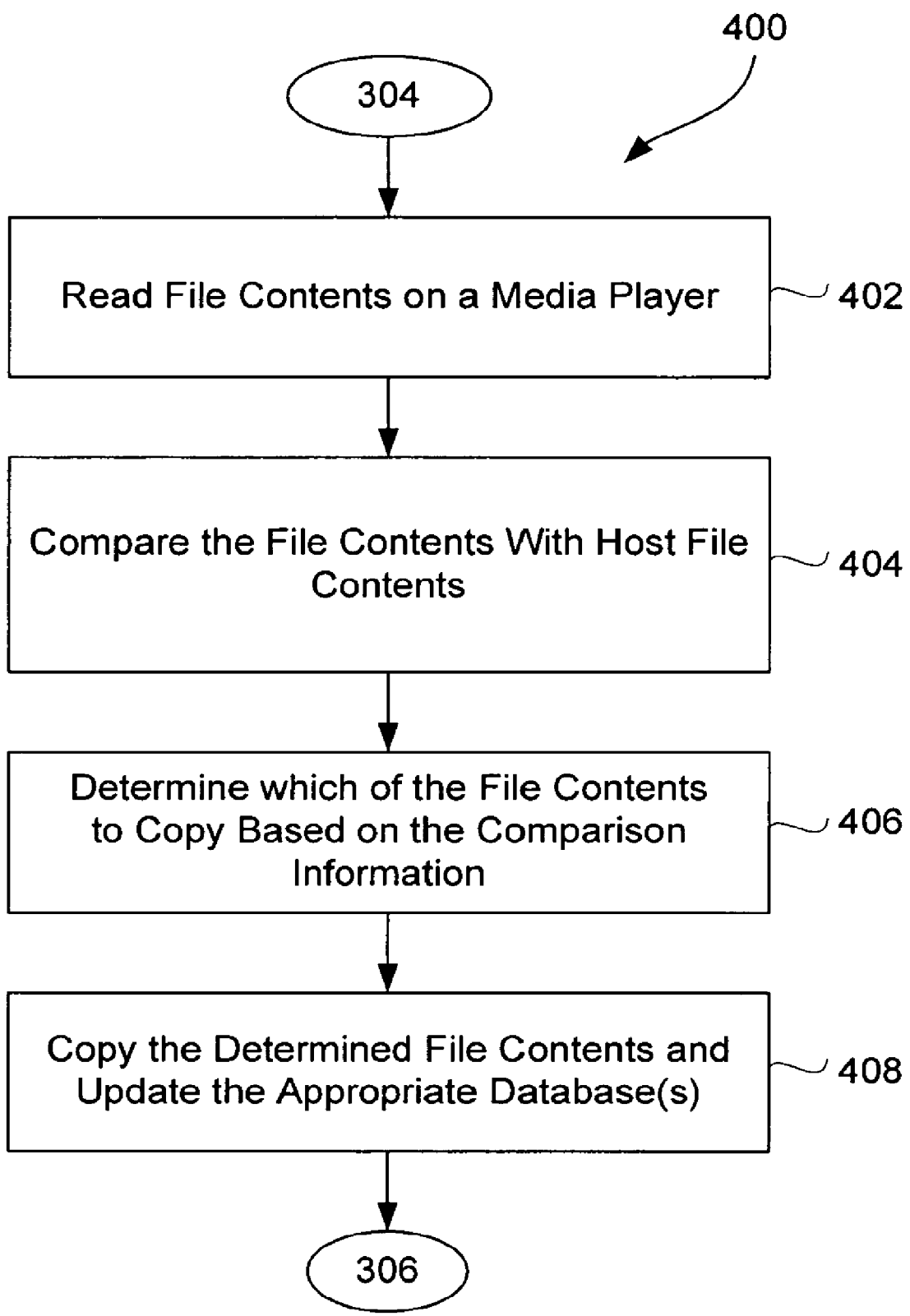
FIG. 5 illustrates a flow diagram of the synchronization process of block 304 of FIG. 4, according to one embodiment of the invention.

FIGS. 5-10 will now describe the process 300 of FIG. 4 in greater detail. FIG. 5 illustrates a flow diagram 400 of the synchronization process of block 304 of FIG. 4, according to one embodiment of the invention. The synchronization processing 400 is, for example, performed by a host computer, such as the personal computer 104 illustrated in FIG. 1 or the personal computer 204 illustrated in FIG. 2. More specifically, the synchronization processing 400 is performed by the media manager 106 illustrated in FIG. 1 or the media manager 206 illustrated in FIG. 2.

The synchronization processing 400 initially reads 402 the file contents of the media player. The file contents can include media files such as media files (song files), text strings, and/or audio files used to implement the audio user interface. When the media items are song files, the text strings and audio files can correspond to song titles, album names and/or artist names, which pertain to characteristics or attributes of the song files. Next, the file contents are compared 404 with the file contents on a host computer. Such comparison produces comparison information concerning differences between the media player file contents and the host computer file contents. Next, the synchronization processing 400 determines 406 one or more of the file contents to copy between the host computer and the media player based on the comparison information. Thereafter, the determined one or more file contents are copied 408 and the appropriate database(s) are updated. Following the operation 408, the synchronization processing 400 is complete and ends.

According to one embodiment, the comparison of player media files and host media files is performed using media file attributes of the various media items. Media file attributes provide descriptive information regarding the media files. Namely, a media file on the media player can be deemed the same media file as one resident on the host computer if its media file attributes sufficiently match. Examples of media file attributes include title, album, track, artist, composer and genre. These attributes are particular to a particular media file. In addition, other media file attributes can pertain to quality characteristics of the media file. Examples of such media file attributes include bit rate, sample rate, equalization setting, volume adjustment, start/stop and total time. Hence, in one embodiment, if the above-identified media file attributes (e.g., title, album, track, artist and composer) pertaining to a media file on the media player all match those same media file attributes pertaining to a media file on the host computer, then the two media files stored on different devices can be deemed the same even though still further attributes or characteristics may cause these media file to not be exact duplications of one another. For example, if modification dates associated with files respectively storing the media file were different, this difference in modification date would not trigger the copying of such media file from the host computer to the media player when the above-identified media file attributes match. Hence, the intelligence of the synchronization processing of the invention allows the amount of data transfer to be properly managed such that it is relatively low or minimized.

Figure 6:
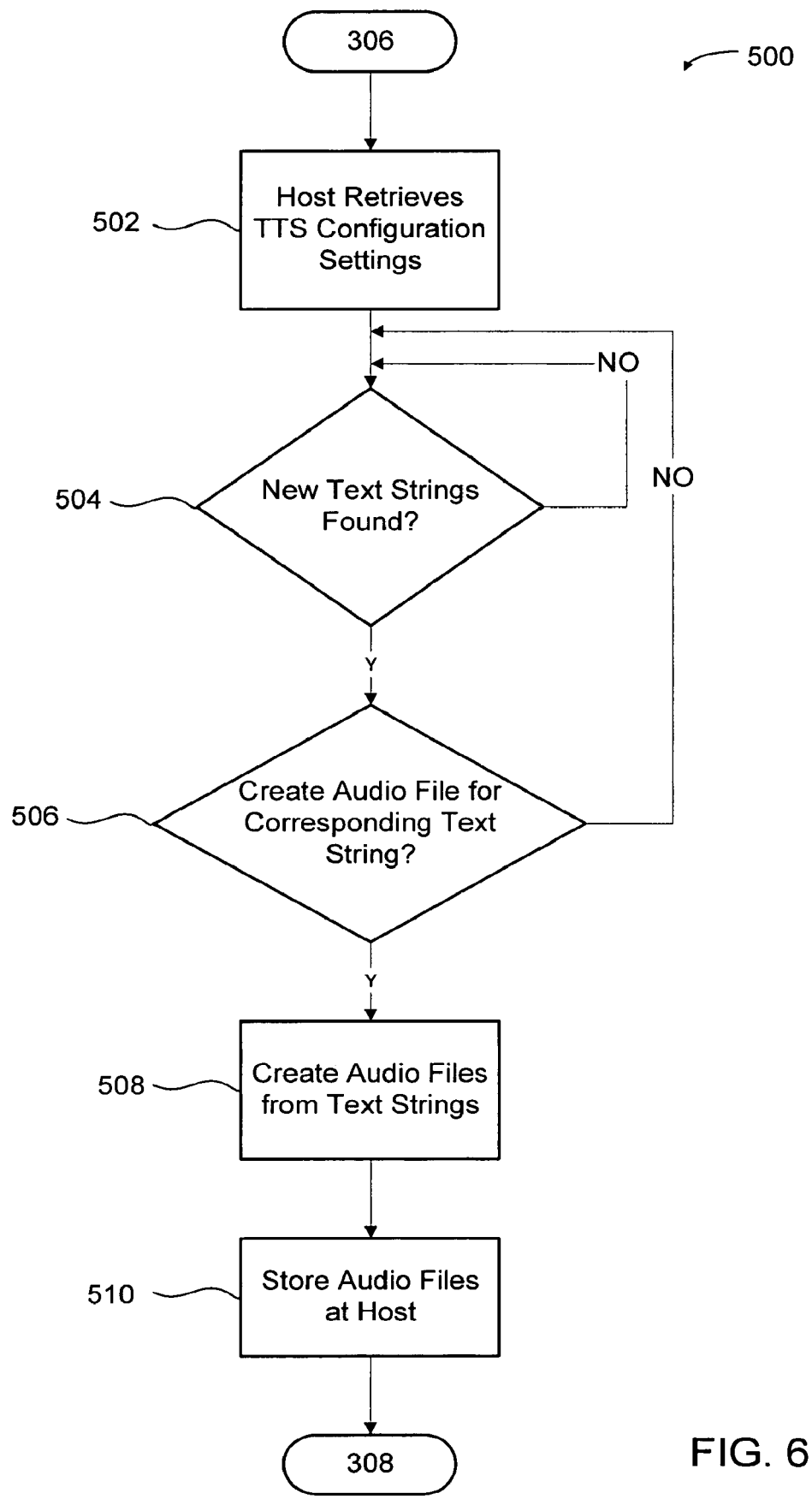
FIG. 6 illustrates a process for creating audio files at a host computer system according to one embodiment of the present invention.

FIG. 6 illustrates a process 500 for creating audio files at a host computer system according to one embodiment of the present invention. Process 500 beings at block 502 where host computer system retrieves configuration settings for a text-to-speech conversion process. The configuration settings can control various aspect of the text-to-speech conversion process. For example, the configuration settings can determine certain text strings to be converted into audio files, quality of the TTS conversions, gender of the voice that verbalizes the text strings, the speed at which an audio prompt is audiblized (e.g., a speaking rate can be increased as the user gets more familiar with the audio prompts), and customizing voices to different subtasks (e.g., the controls and function can be audiblized with one voice while data such as songs and contact names can be audiblized with a different voice). Furthermore, a configuration setting can handle adept manipulation of user interface controls by playing only a part of an audio prompt as a user navigates. For example, while browsing through contact names lexicographically, only the letter (a,b,c . . . ) is rendered until the user reaches the contact name that start with a desired letter. For example, j, as in Jones.

The certain text strings to be converted can be some or all of the text strings on the host or media player. An exemplary partial grouping of certain text strings includes text strings that correspond to a certain depth of nested menus of a user interface for a media player. For example, a user may only desire to hear audio prompts for the first two or three menu levels of the nested menus. Accordingly, it should be understood that the TTS configuration settings can have various settings to correspond to a user's desires.

In decision block 504, the process 500 searches for new text strings requiring TTS conversion. If no new text strings for conversion are found, then the search for new text strings repeats at various time or event intervals until a new text string is found. For example, an event-based interval can be based upon each time a media player is connected to a host computer system.

The host computer system can search for new text strings from different sources. First, the text strings can be loaded onto the host computer system from external media sources, such as compact audio discs, DVD's, Internet websites, and online music stores, or through a local or wide-area network. Typically, these text strings are included within media files or attached to media files. For instance, the text strings for a media file, e.g., MP3 file, can be in an ID3 tag that is commonly provided with the MP3 file.

Secondly, a user can input the text strings directly into the host computer system or into the media player. For example, a user can input text corresponding to a new playlist name or text relating to a new contact. The text relating to a new contact can pertain to information about the contact such as a person's name, address, phone number, email address, and other related contact information. A user may also desire to enter textual descriptions for a media file, for example, a song title, album name, artist name, or a comment.

Thirdly, text strings loaded onto the media player without associated media files can be detected during a synchronization process and thus transferred to the host computer system for text-to-speech conversion. This can occur, for example, when a media player is connected to a host computer system that does not have TTS conversion capability. The text strings that are loaded on the media player can be transferred to a host computer system that does have TTS conversion capability so that audio files can be created.

In some situations, a media file may arrive at the host computer system without any text strings that describe the media file. A host computer can search for the appropriate text strings, for example, on the World Wide Web or through a certain network. After finding and acquiring the appropriate text strings, the TTS engine can then create appropriate audio files that can be loaded onto the media player.

Test strings that require TTS conversion can be entered directly into a media device, for example, when a media device contains its own user input device. For example, some media players or hand-held devices, such as a mobile phone or PDA's, have their own keypad for entering alphanumeric characters. Such text strings can be identified by the host computer system as requiring audio files so that a user interface audio prompt can be incorporated into an audio user interface at the media player or other hand-held device.

In another situation, a TTS engine can create new audio files to replace existing audio files. A user may want to create new audio files that have different characteristics from the older audio files. Some of the characteristics that can be changed are the volume, gender, and/or intonation of the speaking voice.

In block 506, a decision is made as to whether an audio file is to be generated for each of the text strings found in block 504. This decision is based, at least in part, upon the configuration settings retrieved in block 502. If a decision is made to not create an audio file, the process loops back to obtain another text string for conversion in block 504. When an audio file is to be created from a text string, the process 500 proceeds to block 508 where the audio file is actually created.

A text string can be a single word, phrase, or single letters and/or numbers. Various sound synthesizer rules and engines can be used to generate the audio file. A generalized example of a process for converting a word into an audio file can operate as follows. The process for converting the word "browse" begins by breaking the word into fragments that represent diphone units or syllables, such as "b" "r" "ow" "s". Then various techniques generate audio prompts for each component, which can then be combined to form an intelligible word or phrase. The audio file is typically given an extension that corresponds to the type of audio file created. For example, the audio file for "browse" can be identified by a browse.aiff filename, wherein the .aiff extension indicates an audio file.

It is noted that text strings that correspond to standard text strings can have pre-recorded audio files. Such text strings may correspond to common user interface controls, such as "play", "stop", "previous", etc., and to common menu items such as "Music", "Extras", "Backlight." These audio files can be created using a voice talent or speech synthesized from the voice talent's recordings. The other text displayed as part of the media player user interface that is usually user specific, such as contacts and customized playlist names can all be synthesized by building a voice from the voice talent recordings. This provides consistency by having the same voice for all textual data to be presented to the user.

In block 510, the created audio files are stored at the host, at least temporarily, before they are downloaded into a media player. The newly created audio files can be stored in an audio file database, such as the audio file database 216, as individual file items. In some embodiments, newly created audio files that describe a particular media file can be attached to the media file and then stored together in a media database, such as the media database 208. For example, audio files that describe the song title, album name, and artist name can be attached as an audio file onto a media file.

Figures 8, 9:
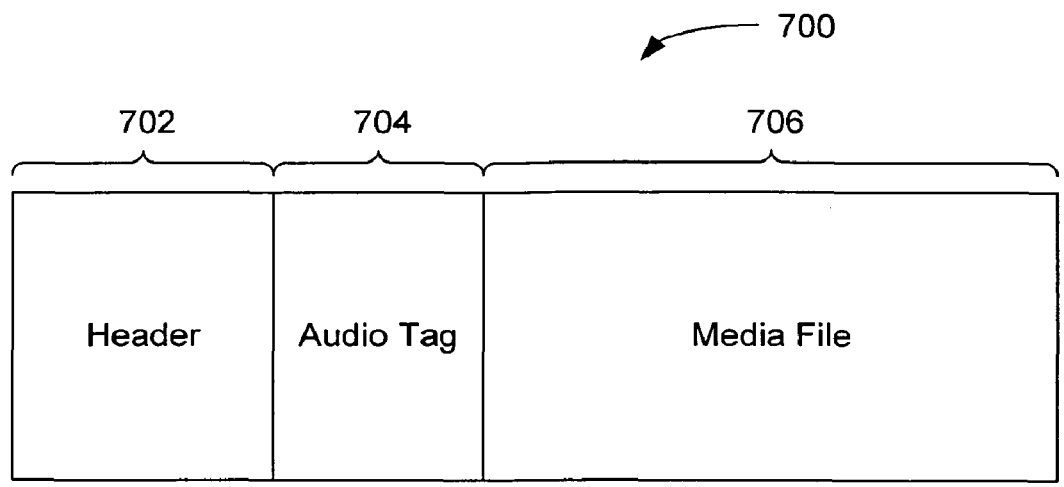
FIG. 8 illustrates a media item that includes a header, an audio tag, and a media file, according to one embodiment of the present invention.
FIG. 9 illustrates a lookup table for keeping track of the pointers in audio tag, according to one embodiment of the present invention.

FIG. 8 illustrates a media item 700 that includes a header 702, an audio tag 704, and a media file 706, according to one embodiment of the present invention. The media file 706 can contain media content pertain to a media item. Examples of media items include a song, a video and images (e.g., pictures).

The audio tag 704 includes one or more audio files. As an example, the audio files can be created during the process 500 illustrated in FIG. 6. The header 702 contains standard data that identifies media item 700. An ID3 tag is an example of such standard data that can be added to a song file, such as an MP3 file. ID3 tags contain information about the attached song file.

In an alternative embodiment that utilizes the data structure of the media item 700, the audio files associated with media file 706 can be stored separately from the media item 700. For example, the associated audio files can be stored in an audio file database (e.g., audio file database 216). In this embodiment, the audio tag 704 includes pointers to the associated audio files. In this way, the size of each media item 700 is reduced. FIG. 9 illustrates a lookup table 800 for keeping track of correlating pointers in the audio tag 704 to the corresponding audio files, according to one embodiment of the present invention. The lookup table 800 includes numbered rows that correspond to each different pointer and its associated audio file. Column 804 contains either the audio file or an address for the audio file that corresponds to the associated pointer. Optionally, the lookup table 800 can include column 802 which contain the text string corresponding to the audio file.

Generally, when a user interacts with a media player to cause an audible response, the user often selects a text string. The media player then locates the audio file corresponding to the selected text string. In one embodiment, the media player locates the audio file corresponding to the text string using a lookup table. The located audio file can then be played at the media player to provide the audible response.

It should be understood that flow diagram 500 illustrates just one implementation of the process for creating audio files. Other implementations of process 500 can perform each of the operation blocks in different sequences. For example, block 502 for retrieving TTS configuration settings can be performed after block 504 or in parallel with block 506.

Figure 7:
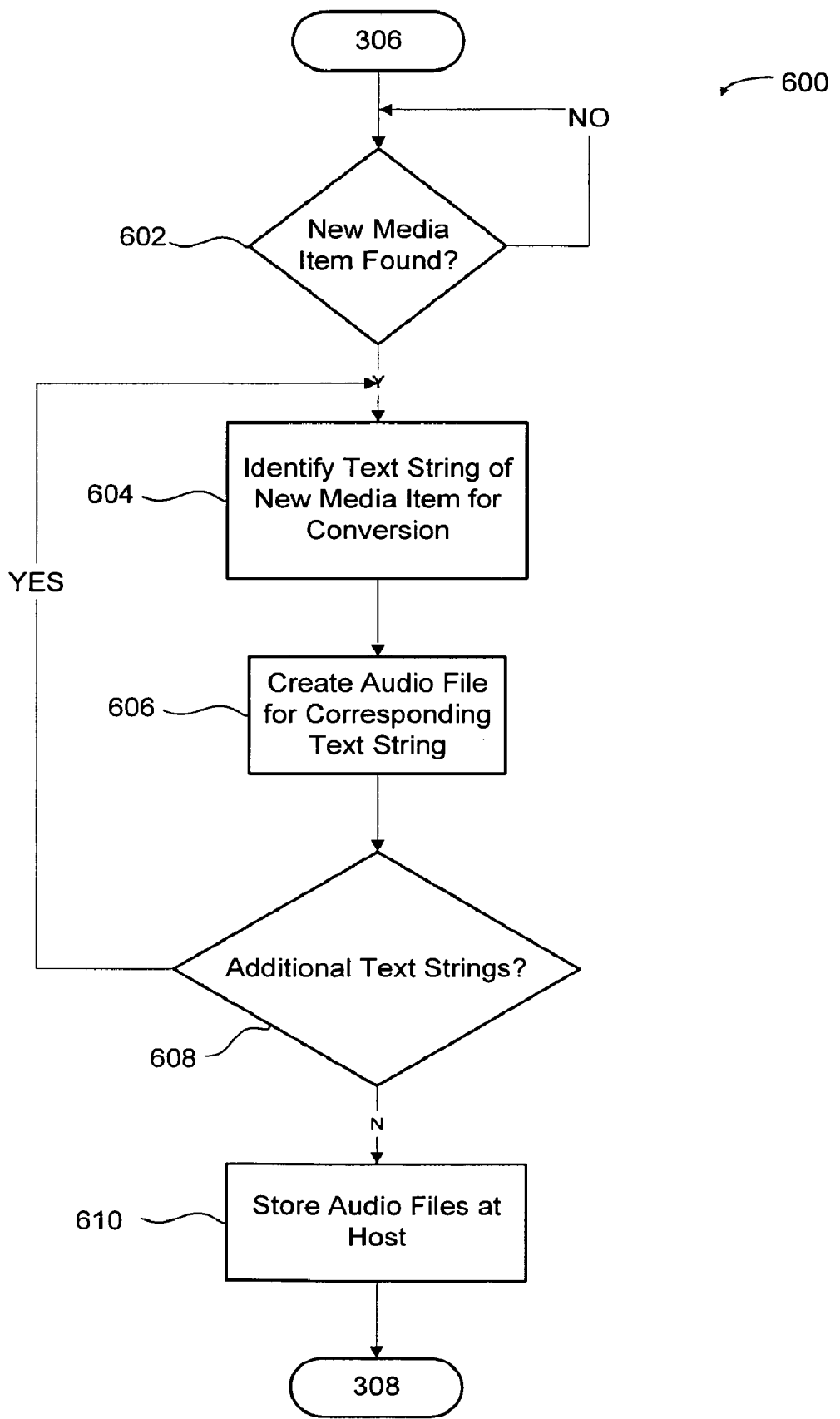
FIG. 7 illustrates a process for creating audio files at a host computer system according to an alternative embodiment of the present invention.

FIG. 7 illustrates a process 600 for creating audio files at a host computer system according to an alternative embodiment of the present invention. Process 600 begins at block 602 where the host computer system searches for new media items on either the host computer system or the media player. A new media item includes media content such as, but not limited to, audio (e.g., song), video (e.g., movie), and image (e.g., picture) files. If no new media items are found, the search process 602 will repeat itself as appropriate, such as after a certain time interval or after a specified event. In alternative embodiments, media files can be any type of digital context that has associated text files.

In block 604, text strings associated with the media item are identified for TTS conversion. For example, each new media item can have one or more associated text strings that describe attributes of the media item. For a song file, such textual descriptions can be a song title, an album name, or an artist name. For a movie, such textual descriptions can be a movie title and names of people featured in the movie.

In block 606, an audio file is created for a text string using TTS conversion techniques. The audio files can be stored using the various techniques as described in FIG. 6 and in the data structures as shown in FIGS. 8 and 9.

In block 608, a decision is made as to whether additional text strings are to be similarly processed to create other audio files. If additionally audio file are to be created, the process 600 returns back to block 604 where the additional text strings for conversion are identified. For instance, after an audio file is created for a text string that describes a song title, the process 600 can return to blocks 604 and 606 in order to create an audio file for a text string pertaining to an album name.

When all the audio files have been created for corresponding text strings, the process 600 proceeds to block 610 wherein the newly created audio files are stored at least temporarily before being downloaded to a media player.

Figure 10:
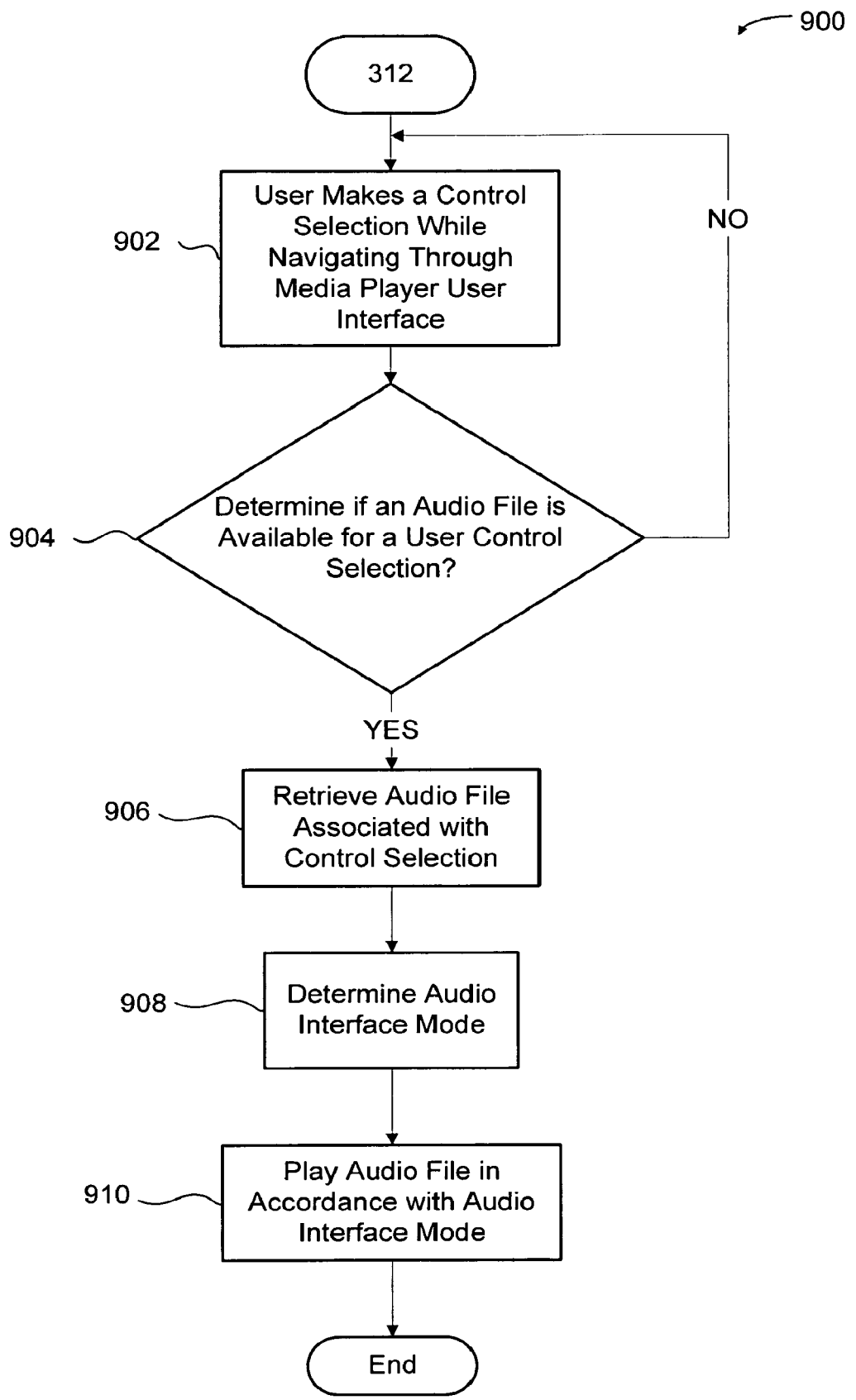
FIG. 10 illustrates a flow diagram that describes a process for generating audio prompts that guide a user through a user interface according to one embodiment of the present invention.

FIG. 10 illustrates a flow diagram 900 that describes a process for generating audio prompts that guide a user through a user interface according to one embodiment of the present invention. The process 900 begins at block 902 where a user makes a user interface control selection while navigating through the user interface of the media player. For instance, a user can make a control selection by using one of the user interface control as shown in FIG. 3 (e.g., select button 259 or previous button 264). Some of the control selections will cause a cursor to highlight different menu items in the display screen 250.

In some embodiments, control selections are accompanied by an audio prompt that confirms the selection to the user. For example, "play" can be audiblized to the user to provide feedback that the play/pause button 266 was actually depressed. These embodiments may involve a repeated user action to make a user interface control selection. For example, a user would make multiple "clicks" of a user interface control to make the selection. A first "click" would cause the hand-held device to audiblize the selected user interface control. For example, "play" would be audiblized when a user presses the play button. This first audio prompt provides audio guidance as to which button has been depressed, which is helpful to a user when not directing visual attention upon the hand-held device. A subsequent "click" would then cause the hand-held device to perform the action corresponding to the user interface control. Continuing with the example, a media file will then be played. On the other hand, the audio prompt may have informed the user that an unintended selection is about to be made. Therefore, the user can attempt to select a different user interface control. For example, the user may then attempt to press a "next" button 262, rather than proceeding to press the play button 266 for a second time.

At decision block 904, a user interface control module determines if an audio file is available for the control selection made by the user. If no audio file is available, the process 900 loops back to block 902 where a user makes the next control selection. If an audio file exists, then in block 906, the user interface control module retrieves the audio file associated with the control selection. The audio file to be retrieved can correspond to a user interface control, information descriptive of a media file, or a menu item. A menu item includes text strings that can appear on the display screen of a media player. The audio file can be retrieved from different types of memory. For instance, commonly used and retrieved audio files can be retrieved from a cache memory. The audio files that are descriptive of a media item may be stored in a media database or an audio file database.

At block 908, the process 900 determines an audio interface mode selected by the user. Various different audio interface modes can be utilized. In some modes, a user may desire to hear an audio prompt for every action and menu item selected by the user. In another mode, a user may deactivate audio prompts for the control selections (e.g., the "play" button) and only hear audio prompts for the highlighted menu items. In another mode, audio prompts are generated for only top-level menu items.

At block 910, the audio prompts are played according to the selected audio interface mode. When a media player is not playing an audio file, only audio files corresponding to the user interface are played and made audible to the user. However, when a media file is being played back, the audio interface mode can be set to mix the media file and audio file playback in different manners. According to one setting, the volume for playing back a media file is reduced when an audio prompt is to be played. For example, the volume for playing back a song or a movie clip is lowered during the playback of the audio prompt. According to another setting, playback of a media file is paused during the playback of an audio prompt and then restarted after the audio prompt has been played. If the process 900 detects that a user is making multiple user control selections in a certain time frame, the playback of the media file can be paused for a short period of time so that the playback of the media file need not be paused and restarted multiple times. This can avoid a repeated interruption of a song's playback. For instance, playback of a media file can be paused for five seconds if a user makes at least three user control selections within 5 seconds. The time periods and number of user control selections may vary depending upon a user's preference. Some audio interface modes can designate that the audio prompts be played through a left, right, or both speakers or earphone channels.

Although the computing device of the present invention has mainly been described as a media player, it should be understood that various types of computing devices can be advantageously used with the present invention. For example, many hand-held devices that have limited processing power for handling a robust text-to-speech conversion engine can advantageously use the present invention. Specifically, the present invention allows hand-held devices to maintain their scaled-down computer architecture while improving their voice generation capabilities. Audio prompts can be generated at a host computer system and loaded onto any of these hand-held devices to provide an audio user interface. The audio prompts will vary in type to describe the various user control selections for each type of hand-held device, the various types of data files, the descriptive text strings for each type of data file, and the various menu items that relate to each type of functionality provided.

A computing device, such as a hand-held device, typically will have less computing power than the host computer system. However, in alternative embodiments, computing device can have the same or more computing power than the host computer system.

The personal computer 204 of FIG. 2 of the present invention serves as a host computer system that supports the TTS engine 214. In alternative embodiments, the host computer system can be various types of computer systems that support a TTS engine. In some embodiments, the host computer system is connected to the World Wide Web such that it can communicate with an online music store, such as with a media management application (e.g., iTunes® by Apple Inc.). In other embodiments, the host computer system can be connected to a local or wide area network such that it can transfer media files and related text strings with other networked computers.

Figure 11:
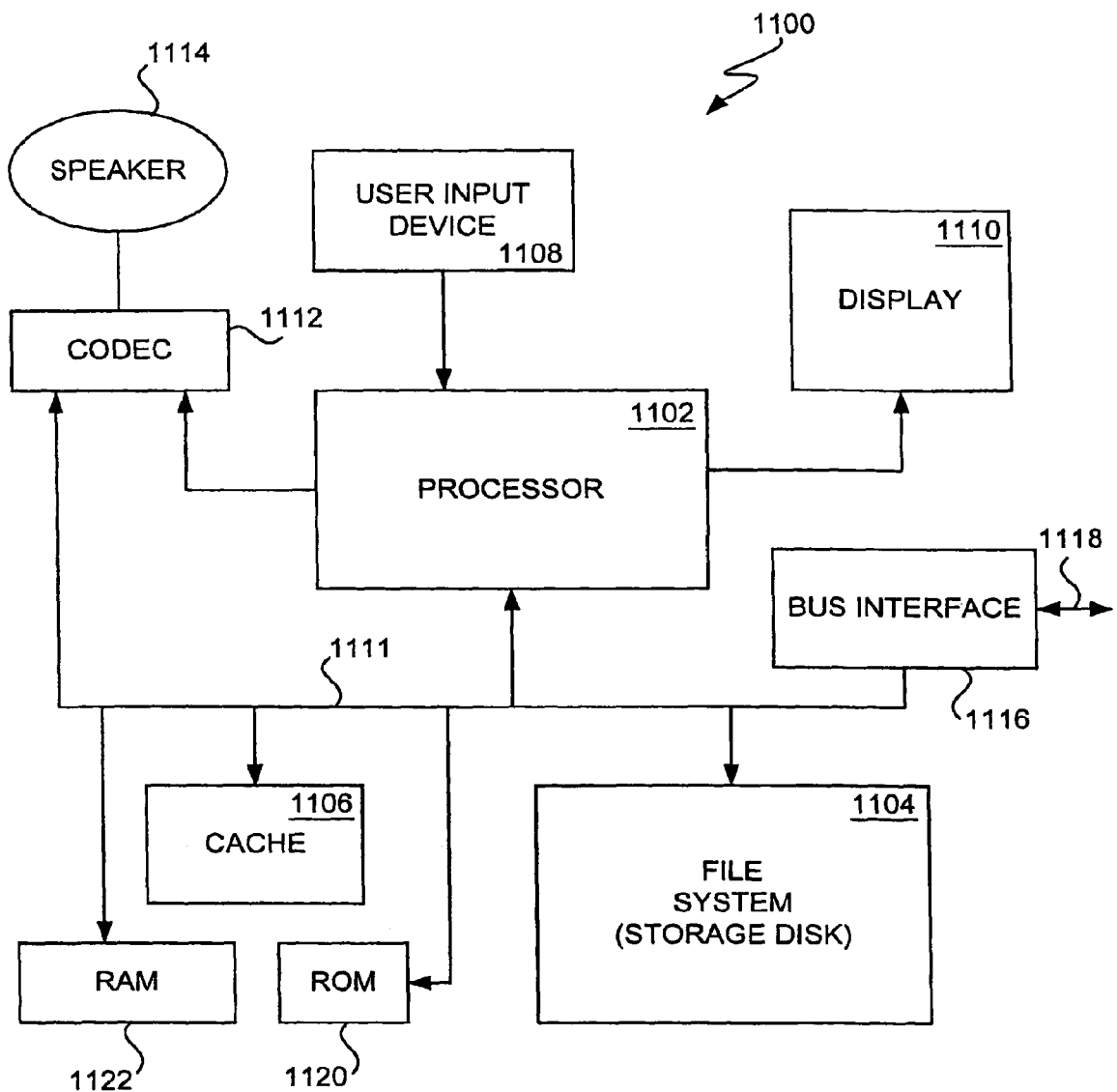
FIG. 11 is a block diagram of a media player according to one embodiment of the invention.

FIG. 11 is a block diagram of a media player 1100 according to one embodiment of the invention. The media player 1100 includes a processor 1102 that pertains to a microprocessor or controller for controlling the overall operation of the media player 1100. The media player 1100 stores media data pertaining to media items in a file system 1104 and a cache 1106. The file system 1104 is, typically, a storage disk or a plurality of disks. The file system 1104 typically provides high capacity storage capability for the media player 1100. However, since the access time to the file system 1104 is relatively slow, the media player 1100 can also include the cache 1106. The cache 1106 is, for example, Random-Access Memory (RAM) provided by semiconductor memory. The relative access time to the cache 1106 is substantially shorter than for the file system 1104. However, the cache 1106 does not have the large storage capacity of the file system 1104. Further, the file system 1104, when active, consumes more power than does the cache 1106. The power consumption is often a concern when the media player 1100 is a portable media player that is powered by a battery (not shown). The media player 1100 also includes a RAM 1120 and a Read-Only Memory (ROM) 1122. The ROM 1122 can store programs, utilities or processes to be executed in a non-volatile manner. The RAM 1120 provides volatile data storage, such as for the cache 1106.

The media player 1100 also includes a user input device 1108 that allows a user of the media player 1100 to interact with the media player 1100. For example, the user input device 1108 can take a variety of forms, such as a button, keypad, dial, etc. Still further, the media player 1100 includes a display 1110 (screen display) that can be controlled by the processor 1102 to display information to the user. A data bus 1111 can facilitate data transfer between at least the file system 1104, the cache 1106, the processor 1102, and the CODEC 1112.

In one embodiment, the media player 1100 serves to store a plurality of media items (e.g., songs) in the file system 1104. When a user desires to have the media player play a particular media item, a list of available media items is displayed on the display 1110. Then, using the user input device 1108, a user can select one of the available media items. The processor 1102, upon receiving a selection of a particular media item, supplies the media data (e.g., audio file) for the particular media item to a coder/decoder (CODEC) 1112. The CODEC 1112 then produces analog output signals for a speaker 1114. The speaker 1114 can be a speaker internal to the media player 1100 or external to the media player 1100. For example, headphones or earphones that connect to the media player 1100 would be considered an external speaker.

The media player 1100 also includes a bus interface 1116 that couples to a data link 1118. The data link 1118 allows the media player 1100 to couple to a host computer.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A hand-held electronic device comprising:
    a media database that stores media content;
    a display device that is capable of visually displaying a user interface that enables a user to interact with the hand-held electronic device, the user interface presenting at least one menu, the at least one menu having a plurality of menu items;
    a user input device capable of receiving a user input pertaining to a selection of at least one of the menu items in the at least one menu;
    a memory, wherein the memory stores media files, each media file having an audio tag containing a pointer to an associated audio cue;
    a user interface control module that, in response to the user input pertaining to a selection of the at least one menu item in the at least one menu receives a manually entered text string corresponding to the at least one menu item, wherein the manually entered text string does not replace a text string currently stored on the hand-held electronic device, and causes the manually entered text string to be passed to a host computer, wherein the host computer converts the manually entered text string to a corresponding audio cue and passes the corresponding audio cue back to the hand-held electronic device.

2. A hand-held electronic device as recited in claim 1, wherein if the user wishes to play the audio file associated with the played audio cue, then the user selects the at least one menu item again, otherwise, the user selects a different menu item.

3. A hand-held electronic device as recited in claim 1, wherein the user input device comprises a touch pad apparatus.

4. A hand-held electronic device as recited in claim 1, wherein the user interface presents at least a series of menus configured in a nested arrangement, each of the menus having at least one menu item.

5. A hand-held electronic device as recited in claim 4,
    wherein the user interface presents at least one of the menus of the series of menus,
    wherein the user input device is capable of receiving a user input pertaining to a selection of at least one of the menu items in the presented at least one menu of the series of menus,
    wherein the memory stores audio files associated with the menu items of the menus of the series of menus, and
    wherein the user interface control module that plays one of the audio files in response to the user input pertaining to a selection of at least one of the menu items in the presented at least one menu of the series of menus.

6. A hand-held electronic device as recited in claim 1, wherein the hand held electronic device is a portable media player.

7. A hand-held electronic device as recited in claim 1, wherein the audio files are provided to the hand-held electronic device by a host computer.

8. A hand-held electronic device as recited in claim 1, wherein the audio files are provided to the hand-held electronic device by a remote computer.

9. A hand-held electronic device as recited in claim 1, wherein the hand-held electronic device further comprises:
    a communications port for receiving audio files created by a host computer and provided to the hand-held electronic device via the host computer.

10. A hand-held electronic device as recited in claim 1, wherein an audio tag is provided with at least one of the media files.

11. A hand-held electronic device as recited in claim 1, wherein each of at least a plurality of the media files comprises:
    an audio tag that is provided within one of the media files; and
    a pointer that is contained within the audio tag, the pointer pointing to an associated audio file.

12. A hand-held electronic device as recited in claim 1, wherein the hand-held electronic device further comprises:
    a text-to-speech conversion engine that creates a respective audio file based upon a text string.

13. A hand-held electronic device as recited in claim 12, wherein the text string describes an attribute of a media file.

14. A hand-held electronic device as recited in claim 12, wherein the text string is song title, an album name, or an artist name.

15. A hand-held electronic device as recited in claim 1, wherein the hand-held electronic device further comprises:
    a communications port for receiving audio files created by a host computer and provided to the hand-held electronic device via the host computer.

16. A hand-held electronic device as recited in claim 1, wherein the audio files are provided to the hand-held electronic device by a remote computer.

17. A hand-held electronic device as recited in claim 1 wherein the hand-held electronic device further comprises:
    text-to-speech conversion engine that creates at least a portion of the audio files.

18. The hand-held electronic device, as recited in claim 1, wherein if the selected menu item is a play icon, then the user interface control module determines if an audio file is available for the control selection made by the user.

19. The hand-held electronic device as recited in claim 18, wherein if the user interface control determines that there is no audio file is available, then the user interface control is configured to receive a next control selection from the user.

20. The hand-held electronic device as recited in claim 18, wherein if the user interface control determines that an audio file exists, then the user interface control module retrieves the audio file associated with the control selection.

21. The hand-held electronic device as recited in claim 20, wherein the audio file to be retrieved can correspond to a user interface control, or information descriptive of a media file, or a menu item wherein the menu item includes text strings that can appear on the display screen.

22. The hand-held electronic device as recited in claim 21, further comprising: a user selectable audio interface mode control module that causes the audio interface to operate in any of a number of user selectable modes of operation.

23. The hand-held electronic device as recited in claim 22, wherein the user selectable modes of operation includes generating an audio prompt for every action and menu item selected by the user or only generating an audio prompt for a highlighted menu item or only generating an audio prompt for a top level menu item.

24. The hand-held electronic device as recited in claim 23, wherein when a media file is being played back, the audio interface operation mode can be set such that the user selectable audio interface mode control module mixes the media file and audio file playback in different manners.

25. The hand-held electronic device as recited in claim 24, wherein a first manner of playing back the audio file is playing back the audio file at reduced volume when the audio prompt is to be played.

26. The hand-held electronic device as recited in claim 24, wherein a second manner of playback of a media file is the playback of the media file is paused during the playback of an audio prompt and then restarted after the audio prompt has been played.

27. The hand-held electronic device as recited in claim 24 wherein if the user interface control module detects that the user is making multiple user control selections in a certain time frame, the playback of the media file can be paused for a short period of time so that the playback of the media file need not be paused and restarted multiple times.

28. The hand-held electronic device of claim 1, wherein the at least one menu item is not uniquely associated with a piece of media content other than the audio cue.

29. A method executed by a processor included in a hand held electronic device, comprising:
displaying a user interface that enables a user to interact with the hand-held electronic device, the user interface presenting at least one menu, the at least one menu having a plurality of menu items;
receiving a text string, wherein the text string does not replace a text string currently stored on the hand-held electronic device;
sending the text string to a host computer that converts the replacement text string to an audio cue and passes the audio cue back to the hand held electronic device;
responding to a user input pertaining to a selection of the at least one menu item associated with the audio cue by playing the audio cue; and
wherein the hand held electronic device further stores a plurality of media files, each media file having an audio tag containing a pointer to an associated audio cue.

30. The method as recited in claim 29, further comprising:
storing the audio file having the embedded audio cue embedded in a memory unit included in the hand held electronic device.

31. The method as recited in claim 30 further comprising:
creating at least a portion of the audio cue using a text-to-speech conversion engine based upon a text string.

32. The method as recited in claim 31, wherein the text string describes an attribute of a media file.

33. The method as recited in claim 32, wherein the attribute of the media file is a song title, an album name, or an artist name.

34. The method as recited in claim 29, wherein if the user wishes to play the audio file corresponding to the played audio cue, then the user selects the at least one menu item again, otherwise, the user selects a different menu item.

35. The method as recited in claim 29, wherein the handheld electronic device further comprises a communications port.

36. The method as recited in claim 35, further comprising:
receiving audio files created by the host computer at the communications port.

37. The method as recited in claim 36, wherein the audio files are received as part of a synchronization procedure between the host computer and the hand held electronic device.

38. The method of claim 29, wherein the at least one menu item is not uniquely associated with a piece of media content other than the audio cue.

* * * * *

UNITED STATES PATENT AND TRADEMARK OFFICE
CERTIFICATE OF CORRECTION

PATENT NO. : 7,779,357 B2
APPLICATION NO. : 11/733126
DATED : August 17, 2010
INVENTOR(S) : Devang K. Naik It is certified that error appears in the above-identified patent and that said Letters Patent is hereby corrected as shown below:

In column 16, line 2, in claim 6, delete "hand held" and insert -- hand-held --, therefor.

In column 16, line 43, in claim 17, delete "claim 1" and insert -- claim 1, --, therefor.

In column 16, line 47, in claim 18, delete "device," and insert -- device --, therefor.

In column 17, lines 31-32, in claim 29, delete "hand held" and insert -- hand-held --, therefor.

In column 18, line 3, in claim 29, delete "hand held" and insert -- hand-held --, therefor.

In column 18, line 7, in claim 29, delete "hand held" and insert -- hand-held --, therefor.

In column 18, line 12, in claim 30, delete "hand held" and insert -- hand-held --, therefor .

In column 18, line 34, in claim 37, delete "hand held" and insert -- hand-held --, therefor.

Signed and Sealed this
Twenty-second Day of November, 2011

David J. Kappos
*Director of the United States Patent and Trademark Office*